(12) United States Patent
Zipplies et al.

(10) Patent No.: US 9,764,963 B2
(45) Date of Patent: Sep. 19, 2017

(54) METHOD FOR THE PRODUCTION OF FREE FLOWING SYNTHETIC CALCIUM FLUORIDE AND USE THEREOF

(71) Applicant: 3M INNOVATIVE PROPERTIES COMPANY, St. Paul, MN (US)

(72) Inventors: Tilman Zipplies, Burghausen (DE); Klaus Hintzer, Kastl (DE); Thorsten Gerdes, Eckersdorf (DE); Achim Schmidt-Rodenkirchen, Bayreuth (DE); Sebastian Seidl, Neumarkt i.d.OPf. (DE); Thomas Berger, Hirschau (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 10 days.

(21) Appl. No.: 14/696,652

(22) Filed: Apr. 27, 2015

(65) Prior Publication Data
US 2015/0353372 A1 Dec. 10, 2015

(30) Foreign Application Priority Data
Jun. 5, 2014 (EP) .................................... 14171262

(51) Int. Cl.
*C01F 11/22* (2006.01)
*C01B 7/19* (2006.01)

(52) U.S. Cl.
CPC .............. *C01F 11/22* (2013.01); *C01B 7/191* (2013.01); *C01B 7/192* (2013.01); *C01P 2004/61* (2013.01); *C01P 2006/12* (2013.01); *C01P 2006/20* (2013.01); *C01P 2006/80* (2013.01)

(58) Field of Classification Search
CPC ....................................................... C01F 11/22
USPC ........................................................ 423/490
See application file for complete search history.

(56) References Cited

U.S. PATENT DOCUMENTS

| | | | |
|---|---|---|---|
| 2,914,474 A * | 11/1959 | Hillyer | .................... C02F 1/583 |
| | | | 210/724 |
| 3,743,704 A | 7/1973 | West | |
| 4,120,940 A | 10/1978 | Warneke | |
| 5,362,461 A | 11/1994 | Ohmi | |
| 6,355,221 B1 * | 3/2002 | Rappas | ................... C01B 7/192 |
| | | | 423/158 |
| 6,451,274 B1 * | 9/2002 | Koizumi | ................. C01B 7/191 |
| | | | 422/139 |

FOREIGN PATENT DOCUMENTS

| | | |
|---|---|---|
| EP | 0 536 051 | 4/1993 |
| JP | H10-330113 | 12/1998 |

OTHER PUBLICATIONS

Machine translation of JP 10-330,113, Dec. 1998.*

* cited by examiner

*Primary Examiner* — Ngoc-Yen Nguyen
(74) *Attorney, Agent, or Firm* — C. Michael Geise

(57) ABSTRACT

The invention relates to a process for producing free-flowing calcium fluoride particles from a diluted aqueous solution of hydrogen fluoride comprising the step of reacting the diluted aqueous solution of hydrogen fluoride with calcium carbonate particles at a temperature of less than 50° C. The invention further relates to the use of the free-flowing calcium fluoride particles for the manufacturing of anhydrous hydrogen fluoride.

13 Claims, 2 Drawing Sheets

Figure 1:
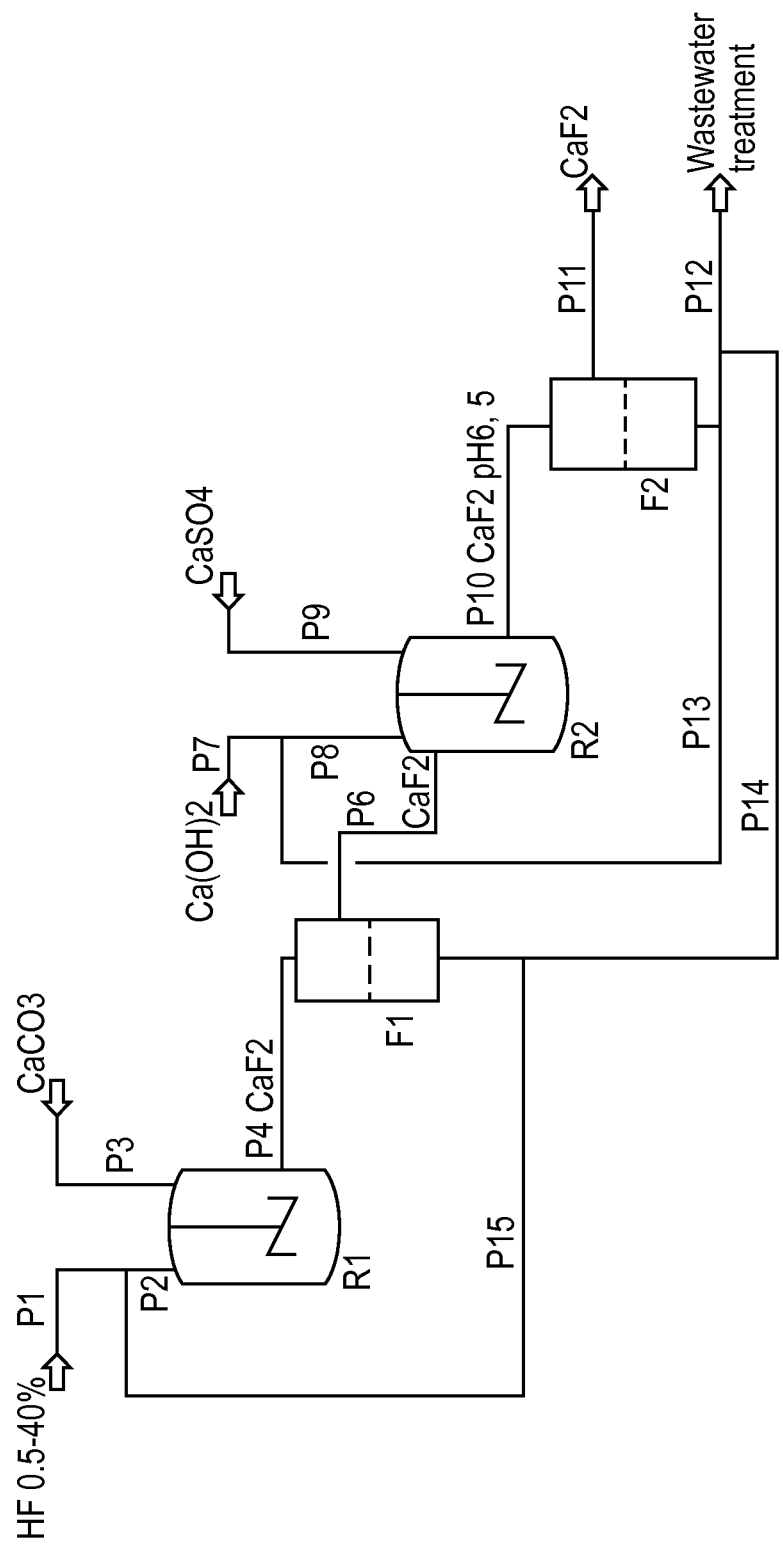

METHOD FOR THE PRODUCTION OF FREE FLOWING SYNTHETIC CALCIUM FLUORIDE AND USE THEREOF

TECHNICAL FIELD

The invention relates to a method for producing free-flowing synthetic calcium fluoride particles by treating calcium c particles with diluted aqueous hydrogen fluoride solutions. The synthetic calcium fluoride particles can be used in manufacturing processes for anhydrous hydrogen fluoride.

BACKGROUND

Diluted aqueous solutions of hydrogen fluoride (HF) are generated during many chemical processes; significant streams are generated by electrochemical fluorination operations or by thermal oxidizers incinerating fluorine-containing off-gas streams. The off-gases are usually scrubbed and the resulting aqueous streams have a concentration of hydrogen fluoride of 0.5 to 40%. These HF solutions cannot be released into the environment without pre-treatment, nor does a waste water treatment tolerate such solutions.

Consequently, these HF streams are treated with aqueous solutions of calcium hydroxide ($Ca(OH)_2$). In this process, calcium fluoride ($CaF_2$) is precipitating. However, the precipitated $CaF_2$ particles are very small, the particle size is usually below 20 µm. To improve the handling properties of the calcium fluoride, organic precipitation agents (flocculants) are added. The final sludge is filtered and land-filled or supplied to cement or steel industry as processing ingredient. Due to the fine particles sizes and the organic residues such calcium fluoride cannot be used to manufacture anhydrous hydrogen fluoride (AHF).

Attempts to generate larger particles of calcium fluoride during the treatment of $Ca(OH)_2$ all failed due to the low solubility product of $CaF_2$.

EP 0 536 051 A1 discloses a method for recovering calcium fluoride from a fluoroetchant. Calcium fluoride of high purity is produced from etchants, mainly composed of hydrogen fluoride, silicon compounds and ammonium fluoride. Calcium fluoride is produced by a reaction of hydrogen fluoride with calcium carbonate at a temperature not lower than 50° C. The reaction is carried out as a two-step process; in the first step a granular calcium carbonate with a grain size of 0.05 to 0.15 mm is used, in the second step a calcium carbonate powder with a grain size of 3 to 30 µm is used. Due to the calcium carbonate powder used for this process, the resulting calcium fluoride contains a significant amount of fine calcium fluoride particles with a grain size of 3 to 30 µm. Due to the fine calcium fluoride particles, it is difficult to use the product in existing manufacturing processes for anhydrous hydrogen fluoride, as the fine particles cannot be processed with sulfuric acid as they would generate a cloud of dust which cannot be tolerated in the manufacturing process of anhydrous hydrogen fluoride. Another disadvantage of this process is the required temperature of ≥50° C. The energy cost for heating the diluted HF makes the process non-economical.

A need still exists for a process for producing free-flowing calcium fluoride from diluted aqueous solutions of hydrogen fluoride which can be used in existing manufacturing processes for anhydrous hydrogen fluoride.

SUMMARY

Surprisingly, it has now been found that milled and optionally classified calcium carbonate ($CaCO_3$) particles can be transferred into synthetic free-flowing calcium fluoride particles upon contact with diluted hydrogen fluoride solutions even at low temperatures <50° C.

In the following there is provided a process for producing free-flowing calcium fluoride particles from a diluted aqueous solution of hydrogen fluoride comprising the step of reacting the diluted aqueous solution of hydrogen fluoride with calcium carbonate particles at a temperature of less than 50° C.

The obtained calcium fluoride particles can be used in existing manufacturing processes for anhydrous hydrogen fluoride.

The calcium carbonate particles do not disintegrate during the reaction and the free flowing behavior of the particles remains.

There is no need to add precipitation or flocculation agents and therefore the calcium fluoride is essentially free of organic residues.

The calcium carbonate particles are converted rapidly into calcium fluoride particles, the residence time is about 1 hour to 10 hours to convert 88% and more of calcium carbonate particles into calcium fluoride particles.

The water content of the separated $CaF_2$ is in the range of 10 to 40% compared to >50% for the $Ca(OH)_2/CaF_2$ sludge of the precipitation process starting from calcium hydroxide. Consequently, the drying time and the energy consumption to generate $CaF_2$ for AHF-production are much lower.

The reaction of the diluted aqueous solution of hydrogen fluoride with the calcium carbonate particles is carried out at lower temperatures <50° C. and without the addition of fine calcium carbonate powder compared to EP 0 536 051 A1.

Another advantage of the present invention is that the process is increasing the specific surface area (BET) of the particles and is generating a quite porous structure of $CaF_2$, which is beneficial for the intended applications.

SHORT DESCRIPTION OF THE FIGURES

Figure 2:
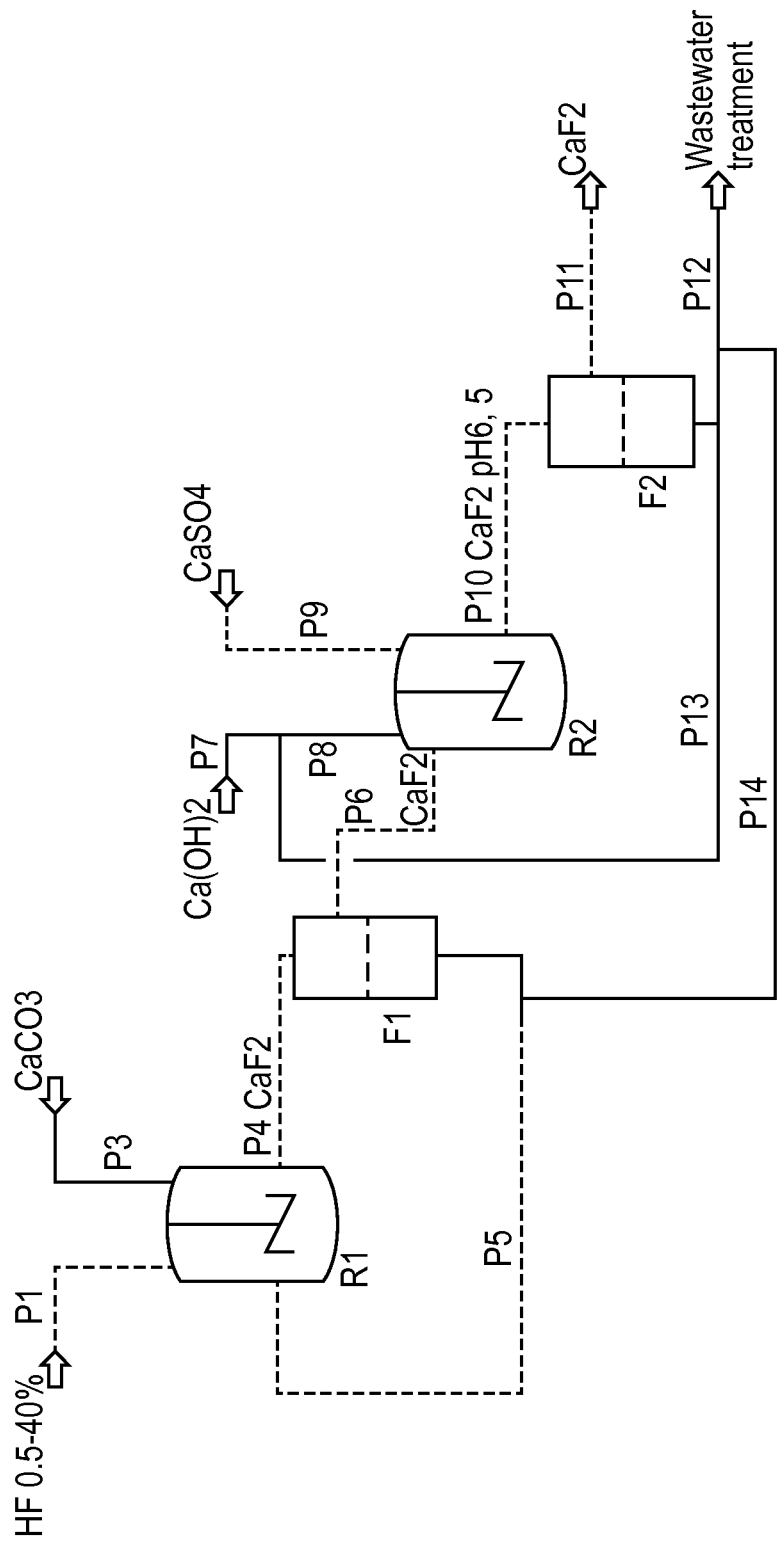

The figures show preferred embodiments of the process described herein. FIG. 1 shows a continuous flow process, FIG. 2 shows a discontinuous process (batch process).

DETAILED DESCRIPTION

The diluted aqueous solutions of hydrogen fluoride used herein for producing free-flowing calcium fluoride particles preferably have a concentration of hydrogen fluoride of 0.5 to 40%, more preferably 1 to 30%. The diluted aqueous solutions of hydrogen fluoride may be obtained from thermal oxidizers incinerating fluorine-containing off-gas streams or from other chemical processes, for example from electrochemical fluorination processes or any other fluorination processes, or from incinerating fluoropolymers.

The calcium carbonate particles used herein for the process for producing free-flowing calcium fluoride particles preferably have a mean particle size ($d_{50}$) of 20 to 200 µm, more preferably 20 to 150 µm, more preferably 30 to 80 µm, most preferably from more than 30 to less than 50 µm. The mean particle size ($d_{50}$) is measured by laser diffraction.

Preferably, not more than 5% of the calcium carbonate particles have a particle size of ≤3 µm.

Preferably, $CaCO_3$ particles with a purity of ≥90%, more preferably ≥95%, are used. The $CaCO_3$ should not contain arsenic or arsenic compounds.

The specific surface area (BET) of the calcium carbonate particles is preferably ≤10 m²/g, more preferably ≤5 m²/g, most preferably ≤2 m²/g.

The step of reacting the diluted aqueous solution of hydrogen fluoride with the calcium carbonate particles is preferably carried out in a reaction vessel as a one-step process. The reaction vessel is preferably equipped with a stirrer. The reaction vessel is suitably made from HF-resistant material, e.g. Inconel or kettle lined with polymer.

A diluted aqueous solution of hydrogen fluoride and a suitable amount of calcium carbonate particles are charged into the reaction vessel.

Preferably, stoichiometric amounts of calcium carbonate and hydrogen fluoride according to the reaction equation $$CaCO_3 + 2HF \rightarrow CaF_2 + H_2O + CO_2 \uparrow$$

are charged into the reaction vessel. Calcium carbonate can also be added in an excess. It is also possible to work with an excess of hydrogen fluoride.

The diluted aqueous solution of hydrogen fluoride and the calcium carbonate particles are reacted in the reaction vessel for a reaction time of 1 to 10 hours, preferably for 2 to 6 hours.

Preferably, the reaction partners are gently agitated during the reaction. The agitation is selected in such a way that the particle size of the $CaCO_3$ particles is not significantly lowered; preferably the particle size of the $CaCO_3$ particles should not be reduced by more than 20%.

The reaction is carried out at a temperature of less than 50° C. Preferably, the reaction temperature is in the range of from 20° C. to less than 50° C., more preferably from 20° C. to 40° C.

The reaction can be carried out without the addition of a flocculation agent.

The reaction is monitored by the amount of formation of $CO_2$ and by controlling the pH value and temperature.

At the end of the reaction time, unreacted hydrofluoric acid is neutralized with an aqueous solution of a base, e.g. KOH, NaOH, $Ca(OH)_2$, CaO or others. The preferred base is $Ca(OH)_2$. If $CaCO_3$ has been added in an excess, no neutralization is necessary.

After neutralization, the reaction product is separated from the water by conventional methods such as filtration, sedimentation or decantation. The separated aqueous phase can be disposed or can be reused to suspend the $CaCO_3$ particles in the reaction vessel. There is no need to wash the separated product. The separated product can be dewatered mechanically, dried by conventional drying methods and, if needed, deagglomerated by milling.

The obtained reaction product are calcium fluoride particles with a content of calcium fluoride of preferably at least 88%, more preferably of at least 90%, more preferably of at least 92%. The calcium fluoride content of the calcium fluoride particles is measured according to ISO 5439. By this method, the content of $CaF_2$ is determined via the concentration of $H_2SiF_6$ which is formed by driving HF out of the calcium fluoride with perchloric acid followed by reacting the formed hydrogen fluoride with $SiO_2$.

The content of calcium carbonate in the obtained calcium fluoride particles is preferably 12% or less, more preferably 10% or less, most preferably 8% or less. The content of calcium carbonate is measured according to ISO 4283.

The XRD analysis of the obtained particles shows calcium fluoride as the main phase with minor amounts of calcium carbonate.

The mean particle size ($d_{50}$) of the obtained calcium fluoride particles is preferably from 20 to 200 µm, more preferably from 20 to 150 µm, more preferably from 25 to 80 µm, most preferably from more than 30 to less than 50 µm. The mean particle size ($d_{50}$) is measured by laser diffraction.

Preferably, not more than 5% of the calcium fluoride particles have a particle size of ≤3 µm.

The particle size does not change very much during the reaction. The size of the calcium fluoride particles can be up to 15 to 25% lower than the size of the starting calcium carbonate particles. The mean particle size ($d_{50}$) of the calcium fluoride particles can be up to 10 to 15% lower than the mean particle size ($d_{50}$) of the starting calcium carbonate particles.

The specific surface area (BET) of the calcium fluoride particles is preferably from 40 to 80 m²/g.

The calcium fluoride particles are free-flowing and can be used in existing manufacturing processes for the production of anhydrous hydrogen fluoride (AHF).

The calcium fluoride particles may have a core of unreacted calcium carbonate which is surrounded by a shell of calcium fluoride. The calcium fluoride particles have a porous structure. The specific surface area (BET) of the starting calcium carbonate particles increases during the reaction to the calcium fluoride particles, from values which are preferably 10 m²/g or less for the calcium carbonate particles to values which are preferably 40 m²/g or more for the calcium fluoride particles. Despite the significant change in the crystalline structure of the particles which transform from calcium carbonate into calcium fluoride and despite the increase of the specific surface area (BET), the calcium fluoride particles obtained by the process presented herein have a stable particle structure which can be used for further processing, e.g. for the manufacturing of anhydrous hydrogen fluoride. The fine-pored structure of the calcium fluoride particles is advantageous for the reactivity and thus for the production of AHF.

With increasing concentration of hydrogen fluoride, the obtained calcium fluoride particles have a more compact structure and the porosity decreases.

In a further embodiment of the invention, the process for producing free-flowing calcium fluoride particles from diluted aqueous solutions of hydrogen fluoride may further comprise the step of adding calcium sulfate ($CaSO_4$). The addition of calcium sulfate ensures a higher particle stability of the highly porous $CaF_2$ particles and further improves the flowability by agglomerating the $CaF_2$ fines. The addition of $CaSO_4$ does not interfere with the further processing, e. g. AHF manufacturing. Calcium sulfate can be added to the reaction vessel at the end of the reaction and before the separation of the water phase. Calcium sulfate can be added to the reaction vessel as a diluted aqueous solution, but it is also possible to add a dry powder of calcium sulfate to the reaction vessel. Another possibility to add the calcium sulfate is by spraying it onto the dried or wet product. Preferably, the $CaSO_4$ is added in the neutralization step when an aqueous solution of a base, preferably $Ca(OH)_2$, is added. If calcium sulfate is added, the resulting calcium fluoride particles may have an outer shell of calcium sulfate, but the calcium sulfate also has the function of a binder for the porous $CaF_2$ particles and for the $CaF_2$ fines which are agglomerated by the added $CaSO_4$.

As already mentioned, the obtained calcium fluoride particles can be used in existing manufacturing processes for anhydrous hydrogen fluoride. In conventional manufacturing processes for anhydrous hydrogen fluoride, calcium fluoride particles are mixed with sulfuric acid and oleum and reacted in a rotary kiln at a temperature of about 300 to 500° C. The reaction products are anhydrous hydrogen fluoride and calcium sulfate. The calcium carbonate residues in the core of the calcium fluoride particles can be tolerated in the manufacturing processes for anhydrous hydrogen fluoride, as the calcium carbonate is reacted to calcium sulfate, carbon dioxide and water. The obtained calcium sulfate can be used, for example, for floor pavements and other architectural applications.

In the following, two preferred embodiments of the inventive process are described using FIGS. 1 and 2.

FIG. 1 shows the flow sheet of a preferred embodiment of the inventive process. In the process shown in FIG. 1, the step of reacting a diluted aqueous solution of hydrogen fluoride with calcium carbonate particles is a continuous flow process. In the continuous flow process, a diluted aqueous solution of hydrogen fluoride and a suspension of calcium carbonate particles are fed continuously into a reaction vessel (R1) and are reacted in the reaction vessel at a temperature below 50° C., and a suspension of calcium fluoride particles is continuously removed from the reaction vessel.

In FIG. 1, the mass flow lines in the flow sheet are designated by "P" numbers and are solid lines to indicate a continuous mass flow. In the following, the continuous flow process of FIG. 1 is described in more detail.

A continuous mass flow P1 of an aqueous 0.5-40% HF solution is fed into the reaction vessel R1. A continuous mass flow P3 of calcium carbonate particles is dosed into the reaction vessel equipped with a stirrer. The stirrer is running continuously, thereby generating a suspension of calcium carbonate particles in an aqueous 0.5-40% HF solution and gently agitating the reaction partners $CaCO_3$ and HF. The molar ratio of $CaCO_3$ to HF is ranging from 1:2 to 1:6. The stirrer should be designed in such a way that the particle size of the $CaCO_3$ particles and especially of the $CaF_2$ product is not significantly lowered; preferably the particle size of the $CaCO_3$ particles should not be reduced by more than 20%. The reaction in reaction vessel R1 can be carried out without the addition of a flocculation agent.

A continuous mass flow P4 of the reacted suspension is removed from the reaction vessel R1. The feed rate of the aqueous 0.5-40% HF solution and the removal rate of the continuous mass flow P4 from R1 are chosen to be equal and should be selected in such a way that the average reaction time of the suspension in reaction vessel R1 is preferably from 1 to 10 hours, more preferably 2 to 6 hours. The reaction temperature is controlled to stay below 50° C. Preferably, the reaction temperature is in the range of from 20° C. to less than 50° C., more preferably in the range of 20° C. to 40° C. The reaction is controlled by monitoring the amount of formation of $CO_2$, the pH value, and the temperature.

The continuous mass flow P4 which is removed from the reaction vessel R1 is transferred to process unit F1 for phase separation. The phase separation in process unit F1 can be done by a filtration step or by a gravity separation, for example with a decanter, or by a flotation process. The continuous mass flow P14 of the separated liquid phase with the remaining unreacted HF is transferred to waste water treatment. Optionally, a continuous flow P15 of separated liquid phase can be recycled into the reaction vessel R1, thereby using the remaining HF of the separated liquid phase. For recycling, the continuous flow P15 is combined with the continuous flow P1 to the continuous flow P2 which is fed into the reaction vessel. The recycling of the separated liquid phase reduces the amount of acid which has to be neutralized.

The separated wet solid phase from process unit F1 is the reaction product from reaction vessel R1, calcium fluoride. For further conditioning a continuous mass flow P6 of the reaction product is transferred to the neutralization reactor R2. In R2, the reaction product is neutralized with a continuous mass flow P7 of an alkaline aqueous solution, e.g. of calcium hydroxide, calcium oxide, potassium hydroxide, sodium hydroxide or others, preferably of calcium hydroxide, to a pH value of 6.5 to 7. If no excess of HF has been used for the reaction in R1 and the pH value has already reached a value of 6.5 or more after the reaction in R1, the neutralization step can be omitted. Optionally, a mass flow P9 of calcium sulfate particles can be added continuously to the neutralization reactor R2. The amount of calcium sulfate particles is 0.01% to 1%, preferably 0.1% to 0.5%, related to the amount of the calcium fluoride particles. By the addition of calcium sulfate particles, the calcium fluoride particles can be stabilized.

A continuous flow P10 of a suspension of calcium fluoride particles is transferred to the second separation step in process unit F2. In process unit F2 the liquid phase is separated from the solid phase. The phase separation in process unit F2 can be done by a filtration step or by a gravity separation, for example with a decanter, or by a flotation process. The separated solid phase is the final product and a continuous mass flow P11 of the final product can be supplied to further conditioning steps like drying. The final product are calcium fluoride particles or, if calcium sulfate particles have been added, calcium fluoride particles stabilized with calcium sulfate.

A continuous mass flow P13 of the separated neutralized liquid phase from process unit F2 can be recycled and transferred to the neutralization step in reaction vessel R2. For recycling, the mass flow P13 is combined with the mass flow P7 of the reactor feed of the alkaline aqueous solution of the base used for neutralization, for example $Ca(OH)_2$, to a mass flow P8 which is fed into the reaction vessel R2. By this recycling step the yield regarding the balance of the base used for neutralization, for example $Ca(OH)_2$, is increased. Any excess mass flow P12 of the separated neutralized liquid phase from process unit F2 is mixed with a mass flow P14 of the excess of the acidic waste water from the process unit F1 and transferred continuously to waste water treatment.

FIG. 2 shows the flow sheet of another preferred embodiment of the inventive process. In the process shown in FIG. 2, the step of reacting a diluted aqueous solution of hydrogen fluoride with calcium carbonate particles is a discontinuous process (batch process). In the batch process, a diluted aqueous solution of hydrogen fluoride and a suspension of calcium carbonate particles are fed discontinuously into a reaction vessel (R1) and are reacted in the reaction vessel at a temperature below 50° C., and a suspension of calcium fluoride particles is discontinuously removed from the reaction vessel.

In FIG. 2, the mass flow lines in the flow sheet are designated by "P" numbers. Solid lines indicate a continuous mass flow, dotted lines indicate a discontinuous mass flow. In the following, the batch process of FIG. 2 is described in more detail. First, a discontinuous mass flow P1 of an aqueous 0.5-40% HF solution is charged into the reaction vessel R1 equipped with a stirrer. Then a mass flow P3 of calcium carbonate particles is added continuously, preferably over a period of ⅔ of the complete reaction time. Alternatively the operation can be reversed and an aqueous suspension of the calcium carbonate particles is first charged into the reaction vessel and then a diluted aqueous solution of hydrogen fluoride is dosed over a certain period, preferably over a period of ⅔ of the complete reaction time. The molar ratio of $CaCO_3$ to HF is ranging from 1:1.8 to 1:2.2.

The reaction is conducted preferably in a non-fixed bed operation. Fixed beds with $CaCO_3$ are not preferred, due to effects such as blocking and a reduced mass transfer coefficient.

The aqueous 0.5-40% HF solution and the calcium carbonate particles are kept in the reaction vessel for 1 to 10 hours reaction time, preferably for 2 to 6 hours.

Preferably, the reaction partners $CaCO_3$ and HF are gently agitated during the reaction. The agitation is selected in such a way that the particle size of the $CaCO_3$ particles is not significantly lowered; preferably the particle size of the $CaCO_3$ particles should not be reduced by more than 20%.

The reaction in reaction vessel R1 is carried out at a temperature of less than 50° C. Preferably, the reaction temperature is in the range of from 20° C. to less than 50° C., more preferably from 20° C. to 40° C.

The reaction in reaction vessel R1 can be carried out without the addition of a flocculation agent.

The reaction is controlled by monitoring the amount of formation of $CO_2$, the pH value, and the temperature.

At the end of the reaction time, a mass flow P4 of the whole reaction suspension is transferred discontinuously into process unit F1 for phase separation. The phase separation in process unit F1 can be done by a filtration step or by a gravity separation, for example with a decanter, or by a flotation process. The water content in the wet solid phase separated in process unit F1 should be in the range of 20% to 60%, preferably from 20% to 40%.

Optionally, one part P5 of the liquid phase separated in process unit F1 can be recycled discontinuously into the reaction vessel R1 and used to prepare the next $CaCO_3$ suspension, thereby using the remaining HF of the liquid phase separated in process unit F1 for the next batch process in reaction vessel R1. The recycling of the separated liquid phase reduces the amount of acid which has to be neutralized. The mass flow P14 of the remaining part of the liquid phase separated in process unit F1 will be transferred to waste water treatment.

The separated wet solid phase from process unit F1 is the reaction product calcium fluoride. The mass flow P6 of the reaction product is transferred discontinuously to the reaction vessel R2 for neutralization. For neutralization an alkaline aqueous solution is used, e.g. of calcium hydroxide, calcium oxide, potassium hydroxide, sodium hydroxide or others, preferably of calcium hydroxide. A mass flow P7 of the alkaline aqueous solution is fed into the reaction vessel R2. If the pH value is approaching a value of 6.5, the neutralization is finished and the feeding of the base is stopped. If no excess of HF has been used for the reaction in R1 and the pH value has already reached a value of 6.5 or more after the reaction in R1, the neutralization step can be omitted. For stabilization of the product, a mass flow P9 of calcium sulfate particles can be added discontinuously to the neutralization reactor R2. The amount of calcium sulfate particles is 0.01% to 1%, preferably 0.1% to 0.5% related to the amount of the calcium fluoride particles.

Subsequently, the mass flow P10 of the neutralized suspension of calcium fluoride particles from reaction vessel R2 is transferred discontinuously to process unit F2 for phase separation. The phase separation in process unit F2 can be done by a filtration step or by a gravity separation, for example with a decanter, or by a flotation process. The apparatus can be the same as used for the phase separation step in process unit F1. The water content in the wet solid phase separated in process unit F2 should be in the range of 10% to 40%, preferably from 10% to 30%. A low water content of the wet solid phase is preferred, as less energy is consumed in a subsequent drying step.

The mass flow P13 of the separated neutralized liquid phase from process unit F2 can be recycled and transferred to the neutralization step in reaction vessel R2. For recycling, the mass flow P13 is combined with the mass flow P7 of the reactor feed of the alkaline aqueous solution of the base used for neutralization, for example $Ca(OH)_2$, to a mass flow P8 which is fed into the reaction vessel R2. By this recycling step the yield regarding the balance of the base used for neutralization, for example $Ca(OH)_2$, is increased.

Any excess mass flow P12 of the separated neutralized liquid phase from process unit F2 is mixed with the excess of the acidic waste water P14 from the process unit F1 and then transferred to waste water treatment.

The separated solid phase from process unit F2 is the final product and a continuous mass flow of the final product P11 can be supplied to further conditioning steps like drying. The final product are calcium fluoride particles or, if calcium sulfate particles have been added, calcium fluoride particles stabilized with calcium sulfate.

The reaction in reaction vessel R1 and the neutralization in reaction vessel R2 can be carried out in different reaction vessels as indicated in the flow sheet of FIG. 2, but it is also possible to perform the reaction and the neutralization in the same reaction vessel (R1). If the reaction and the neutralization are performed in the same reaction vessel, first the reaction is carried out in the reaction vessel R1. When the preset reaction time of the reaction is reached, the neutralization is started by adding the alkaline aqueous solution used for neutralization into the reaction vessel R1. The separation step in process unit F1 is not necessary in this case. On the other hand, the consumption of alkaline solution will be higher compared to the process with two different reaction vessels R1 and R2 and a separation process unit F1 between R1 and R2, as the recycling of the HF will not be possible if only one reaction vessel is used. The yield of $CaF_2$ particles in relation to the process input of HF is lower if only one reaction vessel is used.

EXAMPLES

Examples 1-5 and Reference Examples 5-9

A stirred polypropylene-lined reactor is charged with 300 g of a 10% HF solution. This solution is further diluted with deionized water. The HF concentration is 1% in examples 1, 2, 4, 6 and 8, and 5% in examples 3, 5, 7 and 9. Then a suspension of 75 g $CaCO_3$, suspended in 0.5 L deionized water, is added slowly. The temperature is kept at 20° C. At the end of the reaction time, unreacted HF is neutralized with KOH. The reaction time and the results are listed in table 1.

Examples 1 to 5 are examples according to the invention, examples 6 to 9 are reference examples. The conversion rate indicated in table 1 is the calcium fluoride content of the obtained particles, measured according to ISO 5439. The mean particle sizes ($d_{50}$) of the starting calcium carbonate particles and of the obtained calcium fluoride particles are measured by laser diffraction.

TABLE 1

| Example No. | Mean particle size ($d_{50}$) of used $CaCO_3$ [μm] | HF concentration [%] | Reaction time [min] | Conversion rate [%] | Mean particle size ($d_{50}$) of obtained $CaF_2$ [μm] |
| --- | --- | --- | --- | --- | --- |
| 1 | 48 | 1 | 70 | 92 | 45 |
| 2 | 48 | 1 | 160 | 93 | 42 |
| 3 | 48 | 5 | 160 | 92 | 41 |
| 4 | 94 | 1 | 160 | 90 | 84 |
| 5 | 94 | 5 | 160 | 92 | 83 |
| 6 (reference example) | 48 | 1 | 30 | 75 | 46 |
| 7 (reference example) | 48 | 5 | 30 | 85 | 45 |
| 8 (reference example) | 94 | 1 | 30 | 76 | 91 |
| 9 (reference example) | 94 | 5 | 30 | 80 | 89 |

Example 10 and Reference Examples 11 and 12

Example 10 is an example according to the invention, examples 11 and 12 are reference examples. Into a 600 L Hasteloy reactor equipped with an anchor agitator and a heating jacket 200 kg of a 10% HF solution are placed. 50 kg of $CaCO_3$ ($d_{50}$=35 μm), available from Scheruhn Industrie-Mineralien, Germany, are added in small portions. The reactions are performed at 20° C. (example 10), 50° C. (reference example 11) and 70° C. (reference example 12). The reaction temperature, the reaction time and the results are listed in table 2. The conversion rate indicated in table 2 is the calcium fluoride content of the obtained particles, measured according to ISO 5439.

TABLE 2

| Example | Reaction temperature [° C.] | Reaction time [(h)] | Conversion rate [%] | Mean particle size ($d_{50}$) of obtained $CaF_2$ [μm] |
| --- | --- | --- | --- | --- |
| 10 | 20 | 2 | 92 | 35 |
| 11 (reference example) | 50 | 2 | 94 | 33 |
| 12 (reference example) | 70 | 2 | 94 | 30 |

Example 13

410 g of a 10% HF solution are placed in a polypropylene reactor equipped with an agitator and heated up to 45° C. Under gentle agitation, 100 g of $CaCO_3$ (V/60 available from Scheruhn Industrie-Mineralien, Germany) with a mean particle size ($d_{50}$) of 30 μm are added over a period of 0.5 h. The slurry is agitated for 4 h. After the reaction 3 g CaO are added to neutralize the slurry. The solid product is filtered off and dried at 105° C. The $CaF_2$ content according to ISO 5439 is 95.2%; the mean particle size ($d_{50}$) of the obtained $CaF_2$ is 28 μm.

The invention claimed is:

1. A process for producing free-flowing calcium fluoride particles from an aqueous solution of hydrogen fluoride comprising the step of reacting the aqueous solution of hydrogen fluoride with calcium carbonate particles at a temperature of less than 50° C., further wherein the aqueous solution of hydrogen fluoride has a concentration of hydrogen fluoride of from 0.5 to 40% and the calcium carbonate particles have a mean particle size ($d_{50}$) of from more than 30 to less than 50 μm.

2. The process of claim 1, wherein the diluted aqueous solution of hydrogen fluoride has a concentration of hydrogen fluoride of from 1 to 30%.

3. The process of claim 1, wherein the specific surface area (BET) of the calcium carbonate particles is ≤10 m$^2$/g.

4. The process of claim 1, wherein the diluted aqueous solution of hydrogen fluoride and the calcium carbonate particles are reacted for from 1 to 10 hours.

5. The process of claim 1, wherein the reaction temperature is in the range of from 20° C. to less than 50° C.

6. The process of claim 1, wherein the calcium fluoride content of the free-flowing calcium fluoride particles is at least 88%.

7. The process of claim 1, wherein the content of calcium carbonate in the free-flowing calcium fluoride particles is 12% or less.

8. The process of claim 1, wherein the mean particle size ($d_{50}$) of the free-flowing calcium fluoride particles is from more than 30 to less than 50 μm.

9. The process of claim 1, wherein the specific surface area (BET) of the calcium fluoride particles is from 40 to 80 m$^2$/g.

10. The process of claim 1, further comprising a neutralization step for unreacted hydrofluoric acid.

11. The process of claim 1, further comprising the step of adding calcium sulfate.

12. The process of claim 1, wherein the step of reacting the diluted aqueous solution of hydrogen fluoride with calcium carbonate particles is a continuous flow process.

13. The process of claim 1, wherein the step of reacting the diluted aqueous solution of hydrogen fluoride with calcium carbonate particles is a batch process.

* * * * *